UNITED STATES PATENT OFFICE.

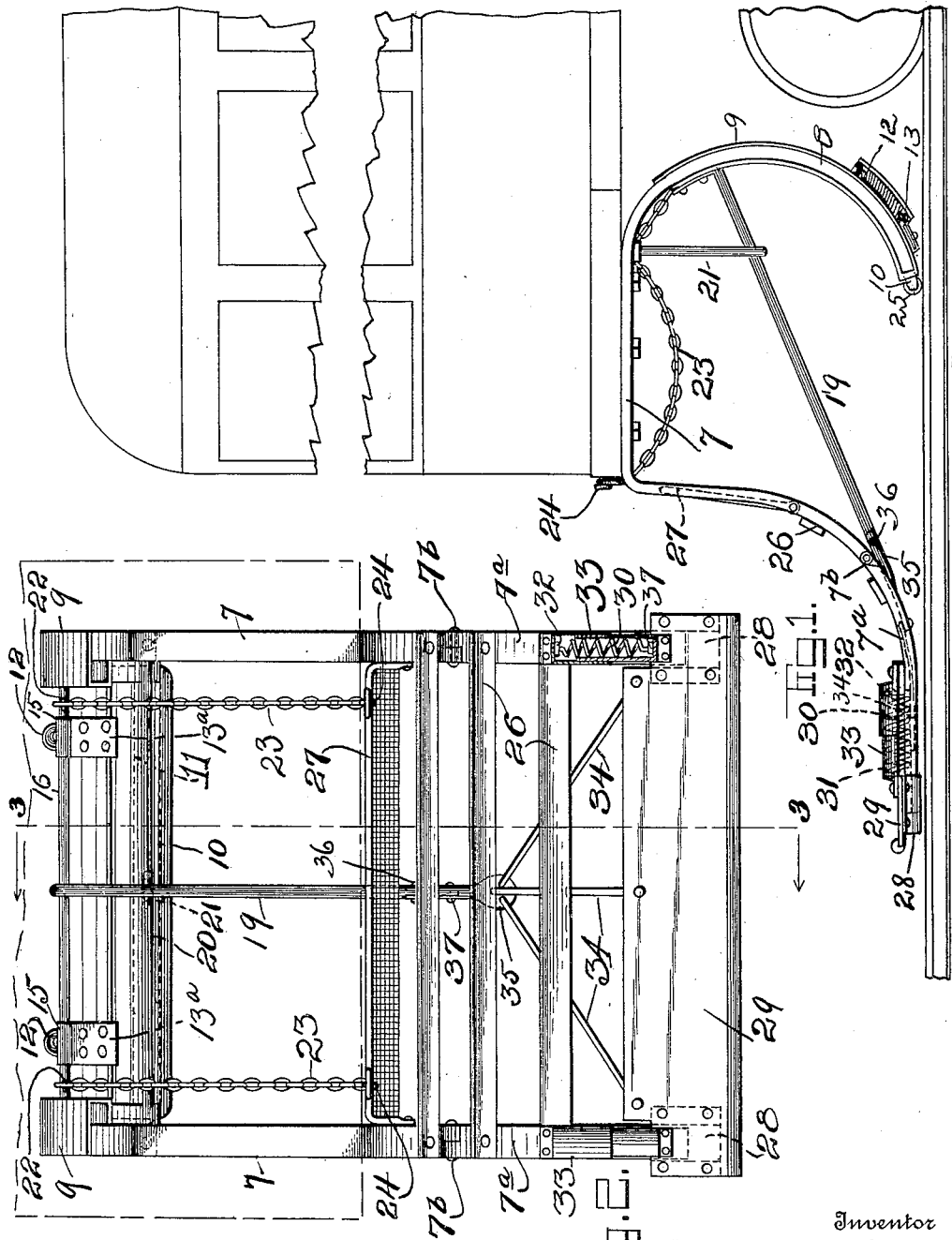

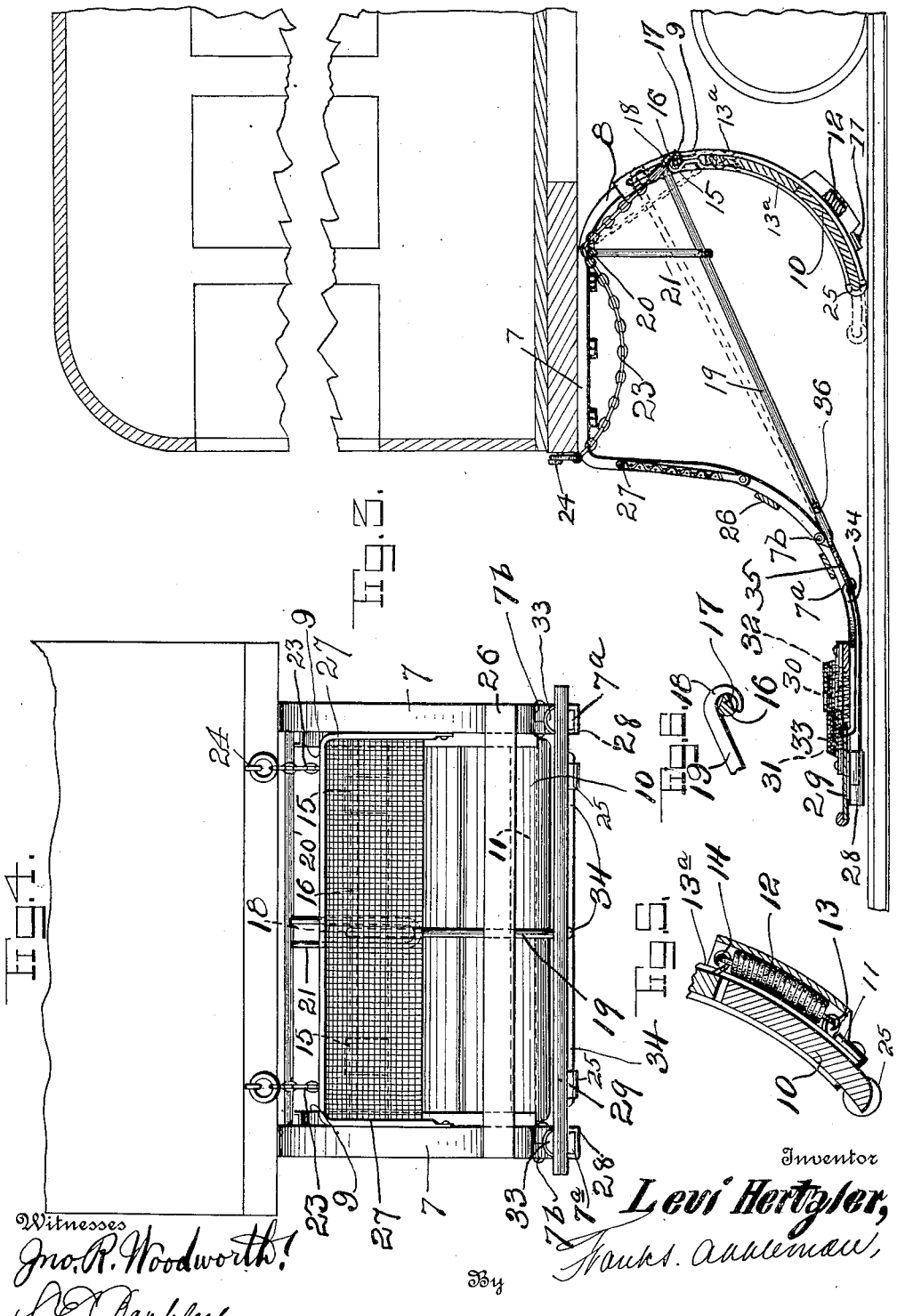

LEVI HERTZLER, OF CARLISLE, PENNSYLVANIA.

COMBINED CAR FENDER AND GUARD.

1,094,652.  Specification of Letters Patent.  Patented Apr. 28, 1914.

Application filed June 19, 1913. Serial No. 774,675.

*To all whom it may concern:*

Be it known that I, LEVI HERTZLER, a citizen of the United States of America, and resident of Carlisle, in the county of Cumberland and State of Pennsylvania, have invented certain new and useful Improvements in Combined Car Fenders and Guards, of which the following is a specification.

This invention relates to car fenders and particularly to a combined fender and guard, the latter of which is released upon impact of the former with an object, as for instance when the fender comes in contact with a person while a car or rolling stock to which the fender is attached is in motion.

An object of this invention is to produce a fender capable of being folded or hinged so that it may be swung to an approximately vertical position when not in use, means being provided for retaining the folded portion of the fender in said approximately vertical position and means being further provided for retaining the fender in lowered position.

A still further object of this invention is to produce a guard to catch a body which might pass under the fender so that the guard will prevent the car from passing over the body, the said fender and guard being so related that actuation of a portion of the fender, due to the impact therewith of the body, will release the guard; it being the purpose of this invention to provide means whereby the guard is positively actuated to cause it to travel toward the track or roadbed instantly it is released through the action of the fender.

A still further object of this invention is to provide a guard having means for retaining it in its elevated position, said means comprising a latch which is actuated by a movable portion of the fender for releasing the said guard.

A still further object of the invention is to provide a combined fender and guard of unitary structure, that is to say the fender and guard are applicable to and removable from a car simultaneously, the said invention comprising comparatively few and inexpensive parts which will prove efficient and satisfactory in use as well as comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a view in elevation of a fragment of a car showing the invention in elevation applied thereto; Fig. 2 illustrates a top plan view of the fender and guard; Fig. 3 illustrates a vertical sectional view of the said fender and guard; Fig. 4 illustrates a front elevation; and Figs. 5 and 6 illustrate detail views of parts of the invention.

In these drawings 7, 7, denote members of a frame, each having a substantially horizontal portion adapted to be secured to the sill or frame of a car, and each member 7 has a curved rearwardly and downwardly extending portion 8 provided with a housing 9 forming a guide for the guard 10 and the parts associated with it. The housings 9 are connected at their lower ends by a plate 11 which forms an anchorage for the springs 12, which springs are secured to lugs 13 or other appropriate fastenings carried by the said plate 11 whereas the guard 10 is provided with two plates 13$^a$ having lugs or ears 14 to which the opposite ends of the springs 12 are connected, it being the purpose of the inventor to have the springs so arranged as to exert a pull on the guard for the purpose of drawing it down when released by mechanism to be presently explained, thus insuring the proper position of the guard with relation to the track when the fender comes in contact with an object. By the term "fender" just mentioned, I mean that part of the device in front of the car and while the guard may be regarded as a part of the fender, the said guard is that portion of the device which is under the car and is intended to operate to prevent objects from passing under the car if they are missed by the so called fender. As shown in the drawings, the plates 13$^a$ are provided with eyes 15 which receive a guide bar 16, said guide bar having its ends slidable in the housing carried by the rearwardly extending portions of the members of the frame. Intermediate its length, the bar is provided with a notch or seat 17 adapted to be engaged by a hook 18 formed on the latch bar 19, which latch bar extends forwardly and has yokes connecting it to a movable portion of the fender to be presently explained.

A stationary rod or bar 20 connects the rear portion of the members 7 and a yoke 21 extends downwardly therefrom and partially embraces the latch bar 19 so that said latch bar is prevented from falling when not in engagement with the guide bar 16. The guide bar 16 has eye-bolts 22 to which chains or other flexible connections 23 are attached, the said members 23 extending forwardly and being supported on hooks or other fastening devices 24 attached to the sill or frame of the car, it being the purpose of the inventor to have these flexible devices act as limiting means for the guard so that the said guard may descend a predetermined distance under the influence of the springs, the said distance being coextensive with the length of the said flexible members. I may provide the guard with anti-friction rollers 25 to run on the rails of a track, but this is an old expedient in fenders when it is desired to prevent the fender from contacting with obstructions along the roadbed.

The fronts of the frame members 7 have extensions 7ª which are hinged at the joints 7ᵇ to the sections 7, the said sections 7ª being tiltable so that they may swing to the position shown in the drawings. The section 7 as well as the section 7ª has suitable body engaging or holding slats 26, although any other approved supports may be supplied for the purpose. A buffer or fender 27 comprising a frame having a wire mesh filling is supported vertically or approximately vertically between the members 7 in front of the car frame so that an object may be prevented from passing under the car between the said frame members.

The outer ends of the hinged members 7ª have slidable housings 28 thereon, which housings carry a front platform or plate 29, the front edge of which may be rounded or shaped to prevent injury when the same contacts with a person and the plate 29 is held normally projected beyond the ends of the hinged members 7ª by means of the springs 30 which springs are connected to ears 31 of the plate and to lugs or brackets 32 carried by extension members 7ª. If desired, the springs 30 may be protected by a suitable housing 33 attached to the hinged member 7ª.

The slidable plate 29 is provided with a series of rearwardly extending arms 34, which arms converge and are attached to a hinged extension 35 of the latch bar 19, it being observed that the extension 35 is hinged, as stated, to the latch bar, but it is secured against movement, under ordinary conditions, by a pin 36 passing through the extension and through the latch bar and this securing device, in addition to the pivot bolt 37 between the extension and latch bar, serves to retain the extension against movement so long as the securing pin is in place.

By reason of the fact that the arms 34 extend from the ends to a point intermediate the length of the plate 29, it is obvious that motion of the plate 29 may be communicated to the latch bar regardless of whether the object struck by the plate 29 comes in contact with the plate at either end or at a point intermediate its length. As the arms are arranged as stated, no lost motion results which will be effective in preventing the communication of motion of the plate to the latch bar so that movement of the plate being communicated to the latch bar, it follows that the guard will be released upon slight movement of the plate 29.

From an inspection of the drawing and the specification herein, it will be obvious that the normal operative position of the guard and fender is shown in Fig. 1, in which view the guard is shown as elevated clear of the rails of the track and the fender is down in operative position. It will also be obvious that in the normal position of the parts, the guard is elevated so that the latch bar is in engagement with the guide bar by which means the guard is held in its elevated position against the action of the springs 12. In the positions of the parts just mentioned and while the car is running free of obstruction, the parts will remain in the positions mentioned, but upon the fender coming in contact with an obstruction sufficient to communicate motion to the plate 29, the latch bar will move rearwardly so that the hooked portion thereof will release the guide bar and the guard will be immediately drawn down to prevent the car from running over the object, since the object will be caught by the guard and carried therewith.

It will be observed from the foregoing description that in applying the combined fender and guard to a car, it is only necessary to attach the frame members to the sill or frame of the car and that all of the operative mechanism associated with the guard and fender is supported and carried by the frame members.

I claim—

1. In a combined fender and guard, frame members, curved housings carried by the frame members at the rear thereof, a guard slidable in the housing, a plate at the rear of the frame members, springs connecting the plate and the guard for normally holding the guard downward, means for holding the guard elevated, a fender, and means actuated by the fender for releasing the guard.

2. In a combined fender and guard, frame members, curved housings carried by the frame members at the rear thereof, a guard slidable in the housing, a plate at the rear of the frame members, springs connecting the plate and the guard for normally holding the guard downward, a latch bar for holding the guard elevated, a fender, a movable member on the fender, means connecting the movable member with the latch bar, and means for holding the movable member projected.

3. In a combined fender and guard, frame members, curved housings carried by the frame members at the rear thereof, a guard slidable in the housing, a plate at the rear of the frame members, springs connecting the plate and the guard for normally holding the guard downward, a latch bar having a hook on its rear end for holding the guard elevated, a fender, a movable member on the fender, means connecting the movable member with the latch bar, and means for holding the movable member projected.

4. In a combined fender and guard, frame members, curved housings carried by the frame members at the rear thereof, a guard slidable in the housing, a plate at the rear of the frame members, springs connecting the plate and the guard for normally holding the guard downward, a latch bar having a hook on its rear end for holding the guard elevated, a fender, a movable member thereon, arms connecting the movable member with the latch bar, and means for holding the movable member projected.

5. In a combined fender and guard, frame members having curved rear ends, housings supported thereby, a guard slidable in the housing, a guide rod associated with the guard, means for drawing the guard toward the rails of a track, a latch bar engaging the guide bar for holding the guard elevated, a fender, and means associated with the fender for actuating the latch bar.

6. In a combined fender and guard, frame members having curved rear ends, housings supported thereby, a guard slidable in the housing, a guide rod associated with the guard, means for drawing the guard toward the rails of a track, a latch bar having a hook on its rear end for holding the guard elevated, a fender, a movable member on the fender, means connecting the movable member with the latch bar, and means for holding the movable member projected.

7. In a combined fender and guard, frame members having curved rear ends, housings supported thereby, a guard slidable in the housing, a guide rod associated with the guard, means for drawing the guard toward the rails of a track, a latch bar having a hook on its rear end for holding the guard elevated, a fender, a movable member thereon, arms connecting the movable member with the latch bar, and means for holding the movable member projected.

8. A combined fender and guard for cars or the like, a frame member suspended from the said car, curved housings carried by the frame members, a guard slidable in the housing, a plate at the rear of the frame members, means for drawing the guard downwardly, a latch bar having means for holding the guard elevated, and means for disengaging the latch bar whereby the said guard is released.

In testimony whereof, I hereunto affix my signature in the presence of two witnesses.

LEVI HERTZLER.

Witnesses:
CHARLES W. WARNER,
LYMAN G. HERTZLER.

---

Copies of this patent may be obtained for five cents each, by addressing the "Commissioner of Patents, Washington, D. C."